(12) United States Patent
Arriagada et al.

(10) Patent No.: US 12,336,552 B2
(45) Date of Patent: Jun. 24, 2025

(54) FISH FEED PREPARED FROM OILSEED PLANTS PRODUCING OMEGA-3 FATTY ACIDS

(71) Applicant: CARGILL, INCORPORATED, Wayzata, MN (US)

(72) Inventors: Paula Isabel Arriagada, Puerto Varas (CL); Alejandro Mauricio Capdeville, Concepción (CL); Diliara Iassonova, Maple Grove, MN (US)

(73) Assignee: Cargill, Incorporated, Wayzata, MN (US)

(*) Notice: Subject to any disclaimer, the term of this patent is extended or adjusted under 35 U.S.C. 154(b) by 0 days.

(21) Appl. No.: 16/305,786

(22) PCT Filed: Jun. 1, 2017

(86) PCT No.: PCT/US2017/035445
§ 371 (c)(1),
(2) Date: Nov. 29, 2018

(87) PCT Pub. No.: WO2017/210426
PCT Pub. Date: Dec. 7, 2017

(65) Prior Publication Data
US 2021/0289817 A1 Sep. 23, 2021

Related U.S. Application Data

(60) Provisional application No. 62/425,815, filed on Nov. 23, 2016, provisional application No. 62/344,351, filed on Jun. 1, 2016.

(51) Int. Cl.
| | | |
|---|---|---|
| *A01H 5/10* | (2018.01) | |
| *A23K 20/158* | (2016.01) | |
| *A23K 40/10* | (2016.01) | |
| *A23K 40/30* | (2016.01) | |
| *A23K 50/80* | (2016.01) | |

(52) U.S. Cl.
CPC ............ *A23K 20/158* (2016.05); *A23K 40/10* (2016.05); *A23K 40/30* (2016.05); *A23K 50/80* (2016.05)

(58) Field of Classification Search
CPC ...... A23K 20/158; A23K 40/10; A23K 40/30; A23K 50/80
USPC .......................................................... 426/2
See application file for complete search history.

(56) References Cited

U.S. PATENT DOCUMENTS

| | | | |
|---|---|---|---|
| 969,954 A | 9/1910 | Holmes | |
| 4,210,634 A * | 7/1980 | Jaeger .................... | A23K 10/26 426/656 |
| 5,773,051 A * | 6/1998 | Kim ....................... | A23K 40/20 426/1 |
| 7,807,849 B2 | 10/2010 | Singh | |
| 8,088,906 B2 | 1/2012 | Qiu | |
| 9,453,183 B2 | 9/2016 | Singh | |
| 9,938,486 B2 | 4/2018 | Petrie | |
| 9,969,954 B2 | 5/2018 | Petrie | |
| 2005/0129739 A1 | 6/2005 | Kohn | |
| 2007/0082008 A1 | 4/2007 | Harel et al. | |
| 2008/0276877 A1 | 11/2008 | Chi et al. | |
| 2010/0222605 A1 | 9/2010 | Stiewe | |
| 2012/0204802 A1 | 8/2012 | Nichols | |
| 2013/0302506 A1 | 11/2013 | Nichols et al. | |
| 2014/0223594 A1 | 8/2014 | Avidov et al. | |
| 2015/0182485 A1 * | 7/2015 | Airaksinen ............ | A23K 10/12 424/93.1 |
| 2016/0010096 A1 | 1/2016 | Chen | |
| 2024/0423241 A1 | 12/2024 | Hong et al. | |

FOREIGN PATENT DOCUMENTS

| | | | |
|---|---|---|---|
| WO | 9849904 W | 11/1998 | |
| WO | WO-02092540 A1 * | 11/2002 | ............. A61P 11/06 |
| WO | 2004071467 A2 | 8/2004 | |
| WO | 2007056823 W | 5/2007 | |
| WO | 2013153404 A1 | 10/2013 | |
| WO | 2015066082 A1 | 5/2015 | |
| WO | 2015077661 A1 | 5/2015 | |
| WO | 2015089587 W | 6/2015 | |
| WO | 2016075303 A1 | 5/2016 | |
| WO | 2016075310 A1 | 5/2016 | |
| WO | 2016075325 W | 5/2016 | |
| WO | 2016075326 A2 | 5/2016 | |
| WO | 2016075327 A2 | 5/2016 | |
| WO | 2016089677 A2 | 6/2016 | |
| WO | 2017023734 A1 | 2/2017 | |
| WO | 2017194728 A1 | 11/2017 | |
| WO | 2017210426 A1 | 12/2017 | |
| WO | 2017219006 A1 | 12/2017 | |
| WO | 2019200118 A1 | 10/2019 | |
| WO | 2020168277 A1 | 8/2020 | |
| WO | 2022098631 A1 | 5/2022 | |
| WO | 2022204454 A1 | 9/2022 | |
| WO | 2023/081920 A1 | 5/2023 | |

OTHER PUBLICATIONS

M.B. Betancor et al.: A nutritionally-enhanced oil from transgenic *Camelina sativa* effectively replaces fish oil as a source of eicosapentaenoic acid for fish. Scientific Reports, vol. 5, No. 1, Jan. 29, 2015, XP055658783.

M.B. Betancor et al: Evaluation of a high-EPA oil from transgenic *Camelina sativa* in feeds for Atlantic Salmon (*Salmo salar* L.): Effects on tissue fatty acid composition, hitology and gene expression, histology and gene expression. Aquaculture vol. 444, Mar. 26, 2015 (Mar. 26, 2015), pp. 1-12 XP055658777, Amsterdam, NL ISSN: 0044-8486, DOI: 10.1016/j. aquaculture.

Miller Matthew R. et al, n-3 Oil sources for use in aquaculture-alternatives to the unsustainable harvest of wild fish, Nutrition Research Reviews, Cambridge University Press, Cambridge, GB, vol. 21, No. 2, Dec. 1, 2008 (Dec. 1, 2008), pp. 85-96, XP009149921, 0954-4224.

(Continued)

*Primary Examiner* — Brent T O'Hern

(57) ABSTRACT

Fish feeds that contain omega-3 fatty acids derived from modified oilseed plants such as *Brassica* and others, in some cases in place of or in addition to omega-3 fatty acids derived from marine oil.

6 Claims, No Drawings

(56) References Cited

OTHER PUBLICATIONS

Noemi Ruiz-Lopez et al. Successful high-level accumulation of fish oil omega-3 long-chain polyunsaturated fatty acids in a transgenic oilseed crop, The Plant Journal, vol. 77, No. 2, Nov. 8, 2013 (Nov. 8, 2013), pp. 198-208, XP055658803, GB ISSN: 0960-7412.

Opsahl-Ferstad H-G et al: Biotechnological approaches to modify rapeseed oil composition for application in aquaculture. Plant Science, Elsevier Ireland Ltd, IE, vol. 165, Jan. 1, 2003 (Jan. 1, 2003). pp. 349-357, XP003013213, ISSN: 0168-9452.

Richard P. Haslam et al. The modification of plant oil composition via metabolic engineering-better nutrition by design, Plant Biotechnology Journal, vol. 11, No. 2, Oct. 16, 2012 (Oct. 16, 2012), pp. 157-168, XP055561053.

Stanley S. Robert, Production of Eicosapentaenoic and Decosahexaenoic Acid-Containing Oils in Transgenic Land Plants for Human and Aquaculture Nutrition, Marine Biotechnology, Springer-Verlag, NE, vol. 8, No. 2, Apr. 1, 2006 (Apr. 1, 2006) pp. 103-109, XP019368196, ISSN: 1436-2236.

Mansour, M. et al: "Characterization of Oilseed Lipids from 'DHA-Producing *Camelina sativa*': A New Transformed Land Plant Containing Long-Chain Omega-3 Oils" Nutrients 2014, 6, 776-789.

Napier, J. et al: "Transgenic plants as a sustainable, terrestrial source of fish oils", Eur. J. Lipid, Sci. Technol. 2015, 117, 1317-1324.

Nichols, P. et al: "Readily Available Sources of Long-Chain Omega-3 Oils: Is Farmed Australian Seafood a Better Source of the Good Oil than Wild-Caught Seafood?" Nutrients 2014, 6, 1063-1079.

Tocher, Douglas R.: "Omega-3 long-chain polyunsaturated fatty acids and aquaculture in perspective". Aquaculture 449 (2015) 94-107.

Bentacor, Monica B., et al., "An oil containing EPA and DHA from transgenic Camelina sativa to replace marine fish oil in feeds for Atlantic salmon (Salmo salar L.): Effects on intestinal transcriptome, histology, tissue fatty acid profiles and plasma biochemistry", PLoS One 12(4): e0175415 2017.

Beyzi et al., "Changes in fatty acid and mineral composition of rapeseed (*Brassica napus ssp. oleifera L.*) oil with seed sizes," Industrial Crops and Products, vol. 129, 2019, pp. 10-14.

Emery, J.,Norambuena, F., Trushenski, J. and Turchini, G. (2016) Uncoupling EPA and DHA in Fish Nutrition: Dietary Demand is Limited in Atlantic Salmon and Effectively Met by DHA Alone. Lipids vol. 51., pp. 399-412.

Han et al., "High level accumulation of EPA and DHA in field-grown transgenic Camelina - a multi-territory evaluation of TAG accumulation and heterogeneity," Plant Biotechnology Journal, 2020, 18, p. 2280-2291.

J Aranceta, C Pérez-Rodrigo—British Journal of Nutrition, 2012 , Recommended dietary reference intakes, nutritional goals and dietary guidelines for fat and fatty acids: a systematic review, 107, S8-S22.

O'Quin et al., "Temperature-sensitive post-translational regulation of plant omega-3 fatty acid desaturases is mediated by the endoplasmic reticulum-associated degradation pathway," The Journal of Biological Chemistry, 2010, 285(28), p. 21781-21796.

Overturf, K., Welker, T., Barrows, F., Towner, R., Schneider, R., LaPatra, S. (2013). Variation in rainbow trout, Oncorhynchus mykiss, to biosynthesize eicosapentaenoic acid and docosahexaenoic acid when reared on plant oil replacement feeds. J. World Aquacult. Soc., vol. 44, No. 3, 326-337.

Pan et al., "The effect of cultivar, seeding rate and applied nitrogen on Brassica carinata seed yield and quality in contrasting environments" Canadian Journal of Plant Science, 92(5):961-971, Sep. 2012.

Ytrestøyl et al., "Utilisation of feed resources in production of Atlantic salmon (Salmo salar) in Norway" Aquaculture 448:365-374, Nov. 1, 2015.

Bell et al., "Dioxin and dioxin-like polychlorinated biphenyls (PCBs) in Scottish farmed salmon (Salmo salar): effects of replacement of dietary marine fish oil with vegetable oils" Aquaculture 243(1-4):305-314, Jan. 3, 2005.

Bell et al., "Rapeseed oil as an alternative to marine fish oil in diets of post-smolt Atlantic salmon (Salmo salar): changes in flesh fatty acid composition and effectiveness of subsequent fish oil "wash out"" Aquaculture 218 (1-4):515-528, Mar. 27, 2003.

Bell et al., "Replacement of dietary fish oil with increasing levels of linseed oil: modification of flesh fatty acid compositions in Atlantic salmon (Salmo salar) using a fish oil finishing diet" Lipids 39:223-232, Mar. 2004.

Bell et al., "Replacement of fish oil with rapeseed oil in diets of Atlantic salmon (Salmo salar) affects tissue lipid compositions and hepatocyte fatty acid metabolism" The Journal of nutrition, 131(5): 1535-1543, May 1, 2001.

Betancor et al., "Nutritional Evaluation of an EPA-DHA Oil from Transgenic Camelina sativa in Feeds for Post-Smolt Atlantic Salmon (Salmo salar L.)" PLOS ONE 11(7): e0159934, Jul. 25, 2016, 28 pages.

Betancor et al., "Oil from transgenic Camelina sativa as a source of EPA and DHA in feed for European sea bass (Dicentrarchus labrax L.)" Aquaculture 530:735759, 12 pages, Jan. 15, 2021.

Betancor et al., "Replacement of Marine Fish Oil with de novo Omega-3 Oils from Transgenic Camelina sativa in Feeds for Gilthead Sea Bream (Sparus aurata L.)" Lipids, 51(10): 1171-1191, Epub Sep. 2, 2016.

Caballero et al., "Impact of different dietary lipid sources on growth, lipid digestibility, tissue fatty acid composition and histology of rainbow trout, Oncorhynchus mykiss" Aquaculture 214(1-4):253-271, Nov. 15, 2002.

Fao, 2014. The State of World Fisheries and Aquaculture 2012. Food and Agriculture Organization of the United Nations. Rome, Italy. 243 pages.

Fonseca-Madrigal et al., "Influence of dietary palm oil on growth, tissue fatty acid compositions, and fatty acid metabolism in liver and intestine in rainbow trout (Oncorhynchus mykiss)" Aquaculture Nutrition 11(4):241-250, Aug. 2005.

Hossain et al., "Optimizing the fatty acid profile of novel terrestrial oil blends in low fishmeal diets of rainbow trout (Oncorhynchus mykiss) yields comparable fish growth, total fillet n-3 LC-PUFA content, and health performance relative to fish oil. Aquaculture" 545:737230, Dec. 15, 2021, 11 pages.

Hu et al., "Comparative analysis of miRNAs of two rapeseed genotypes in response to acetohydroxyacid synthase- inhibiting herbicides by high-throughput sequencing" Plos One 12(9): e0184917, Sep. 26, 2017.

Menoyo et al., "Impact of n-3 fatty acid chain length and n-3/n-6 ratio in Atlantic salmon (Salmo salar) diets" Aquaculture 267(1-4):248-259, Jul. 3, 2007.

Moore, "GM and algal oil benefits to salmon health studied" Fish Farming Expert. com [online] retrieved from the Internet: < URL: https://www.fishfarmingexpert.com/abderdeen-university-algal-oil-bbsrc/gm-and-algal-oil-benefits-to-salmon-health-studied/1201388>, Dec. 16, 2019, 7 pages.

Nanton et al., "Muscle lipid storage pattern, composition, and adipocyte distribution in different parts of Atlantic salmon (Salmo salar) fed fish oil and vegetable oil" Aquaculture 265(1-4):230-243 May 1, 2007.

Naylor et al., "Effect of aquaculture on world fish supplies" Nature 405(6790): 1017-1024, Jun. 29, 2000.

Osmond et al., "The future of genetic engineering to provide essential dietary nutrients and improve growth performance in aquaculture: advantages and challenges" Journal of the World Aquaculture Society 50(3):490-509, Jun. 2019.

Tan et al., "Imidazolinone-tolerant crops: history, current status and future" Pest Manag Sci. 61(3):246-257, Mar. 2005.

Tocher et al., "Omega-3 long-chain polyunsaturated fatty acids, EPA and DHA: Bridging the gap between supply and demand," Nutrients 11(1):89, Jan. 4, 2019.

Tocher, "Fatty acid requirements in ontogeny of marine and freshwater fish" Aquaculture research 41(5):717-732, Apr. 2010.

Tocher, "Metabolism and functions of lipids and fatty acids in teleost fish" Reviews in fisheries science 11(2): 107-184, Apr. 1, 2003.

(56) References Cited

OTHER PUBLICATIONS

Torstensen et al., "Tailoring of a cardioprotective muscle fatty acid composition of Atlantic salmon (Salmo salar) fed vegetable oils" Food chemistry 87(4):567-580, Oct. 1, 2004.

Wijekoon et al., "Effect of dietary substitution of fish oil with flaxseed or sunflower oil on muscle fatty acid composition in juvenile steelhead trout (Oncorhynchus mykiss) reared at varying temperaturas" Aquaculture 433:74-81, Sep. 20, 2014.

Wijekoon et al., "Reprint of 'Effect of dietary substitution of fish oil with flaxseed or sunflower oil on muscle fatty acid composition in juvenile steelhead trout (Oncorhynchus mykiss) reared at varying temperatures" Aquaculture, vol. 447 (2015) pp. 108-115.

* cited by examiner

FISH FEED PREPARED FROM OILSEED PLANTS PRODUCING OMEGA-3 FATTY ACIDS

CROSS-REFERENCE TO RELATED APPLICATIONS

This application is a national phase application of international application PCT/US2017/035445, filed Jun. 1, 2017, entitled "FISH FEED PREPARED FROM OILSEED PLANTS PRODUCING OMEGA-3 FATTY ACIDS", which application claims the benefit of U.S. Provisional patent Application Ser. No. 62/344,351, filed on Jun. 1, 2016, entitled FISH FEED PREPARED FROM OILSEED PLANTS PRODUCING OMEGA-3 FATTY ACIDS, and U.S. Provisional patent Application Ser. No. 62/425,815, filed on Nov. 23, 2016, entitled FEED PREPARED FROM OILSEED PLANTS PRODUCING OMEGA-3 FATTY ACIDS, which applications are hereby incorporated by reference herein in their entirety.

FIELD

This application relates to fish feeds that contain omega-3 fatty acids derived from modified oilseed plants such as *Brassica* and others, in some cases in place of or in addition to omega-3 fatty acids derived from marine oil.

BACKGROUND

The farming of fish such as salmon, tilapia, and shrimp, among other species, is now a major world industry and much of the fish now consumed in the human diet is farmed rather than wild caught. One of the dilemmas of fish farming, however, is that farmed fish, especially carnivorous farmed fish like salmon, need a feed source that is relatively rich in the nutrients that they would typically ingest in the wild, such as the long-chain omega-3 fatty acids like EPA (eicosapentaenoic acid), DPA (docosapentaenoic acid), and DHA (docosahexaenoic acid), that are found in marine oils, such as in fish oils. Obtaining these nutrients from natural marine sources like bait fish (e.g. menhaden) and krill in order to feed farmed fish can exacerbate already declining wild fish populations that rely on those smaller fish species. Thus, fish feeds in which long-chain omega-3 fatty acids are derived from non-marine sources are particularly desirable.

Fish feed products are typically made from a mix of components needed to satisfy the nutritional requirements of the fish, such as an appropriate mix of proteins, carbohydrates, vitamins and minerals, and fats. Fish feeds are often made into solid forms such as pellets or dust-free powders for easy distribution and storage. For example, the international published patent application WO 98/49904, incorporated herein by reference, describes methods of making fish feed pellets that may have relatively low leakage of oils.

SUMMARY

The present invention concerns fish feed materials in which at least some of the long-chain omega-3 fatty acids (i.e., those of 20 or more carbon atoms) are derived from oils of genetically modified oilseed plant lines rather than from marine oils such as fish oils. In some embodiments, the fish feeds contain do not contain marine oil and/or fish meal.

Exemplary embodiments include fish feeds prepared from a set of ingredients comprising 20-40% of an oil component, such as 25-35%, 25-30%, or 30-35% oil, wherein 5-8%, such as 5-6%, 5.5-6%, 5.8-6%, 5.9%, 6-7%, 6-6.5%, 6.5-7%, 7-8%, 7-7.5%, 7.5-8%, 7.6-7.8%, or 7.7%, of the fatty acids in the oil component comprise EPA (eicosapentaenoic acid) and DHA (docosahexaenoic acid) produced by a genetically modified oilseed crop plant. In some embodiments, 35-95% of the oil component in the set of ingredients comprises oil derived from the genetically modified oilseed crop plant.

In some embodiments, the fish feed does not contain any, or minimal, or less than 5%, EPA or DHA derived from marine oil. In some embodiments, the fish feed does not contain marine oil.

In some embodiments, 0-10% of the oil component in the set of ingredients is linseed oil. In some embodiments, 0-10% of the oil component in the set of ingredients is non-marine animal fat, such as poultry fat. In some embodiments, 10-13% of the oil component in the set of ingredients is soy lecithin. In some embodiments, 0-5% of the oil component in the set of ingredients is dry fat.

In some embodiments, >40%, 40-70%, 70-95%, or 85-95% of the oil component in the set of ingredients comprises oil derived from the genetically modified oilseed crop plant. The oilseed crop plant, for example, may include any of *Brassica*, flax, linseed, hemp, walnut, evening primrose, soy, sunflower, cotton, corn, olive, safflower, cocoa, peanut, hemp, *Camelina, crambe*, palm, coconut, sesame, castor bean, *lesquerella*, tallow, seanuts, tungnuts, kapok fruit, poppy, jojoba, *perilla*, or groundnut species. Furthermore, in some embodiments, the oilseed plant is a *Brassica* species or *Camelina* species. *Brassica* plants may include, for example, *B. napus, B. juncea*, and *B. rapa* (rapeseed) species, while *Camelina* species include, for example, *C. sativa*.

In some embodiments, the oil component comprises EPA and DHA that is derived from an oil of a genetically modified oilseed crop plant, comprising 7-35% EPA and DHA, such as 7-20%, 8-15%, 9-10%, 10-11%, 11-12%, 12-13%, or 13-14%. In some embodiments, the modified oilseed crop plant oil further comprises 3-8% DPA.

In some embodiments, the oil component used to prepare the fish feed includes the following:
(a) 55-75% modified oilseed crop plant oil comprising EPA and DHA;
(b) 0-15% animal fat, such as poultry fat;
(c) 0-12% rapeseed oil;
(d) 4-8% linseed oil;
(e) 10-13% soy lecithin; and
(f) 0-5% dry fat;
wherein the fish feed docs not comprise marine oil, and further wherein the EPA and DHA content of the oil component is 5.5-6.5%, or 5.8-6%.

In some embodiments, the oil component comprises:
(a) 70-95% modified oilseed crop plant oil comprising EPA and DHA;
(b) 0-5% animal fat, such as poultry fat;
(c) 0-20% rapeseed oil;
(d) 0-5% linseed oil;
(e) 0-5% soy lecithin; and
(f) 0-5% dry fat;
wherein the oil component does not comprise marine oil, and further wherein the EPA and DHA content of the oil component is 7.5-8%, such as 7.6-7.8%, or such as 7.6%, 7.7%, 7.8%, 7.9%, or 8%.

In some embodiments, the oil component comprises:
(a) 45-65% modified oilseed crop plant oil comprising EPA, DPA, and DHA;
(b) 0-15% animal fat, such as poultry fat;

(c) 0-20% rapeseed oil;
(d) 0-8% linseed oil;
(e) 0-13% soy lecithin; and
(f) 0-5% dry fat;
and wherein the oils component does not comprise marine oil, and further wherein the EPA, DPA, and DHA content of the oil component is 5.5-6.5%, or 5.8-6.

In some embodiments, the oil component comprises:
(a) 65-85% modified oilseed crop plant oil comprising EPA and DHA;
(b) 0-5% animal fat, such as poultry fat;
(c) 0-30% rapeseed oil;
(d) 0-5% linseed oil;
(e) 0-5% soy lecithin; and
(f) 0-5% dry fat;
and wherein the oil component does not comprise marine oil, and further wherein the EPA, DPA, and DHA content of the oil component is 7.5-8%, such as 7.6-7.8%, or such as 7.6%, 7.7%, 7.8%, 7.9%, or 8%.

In some embodiments, the oil component comprises:
(a) 45-65% modified oilseed crop plant oil comprising EPA and DHA;
(b) 0-5% animal fat, such as poultry fat;
(c) 0-45% rapeseed oil;
(d) 0-5% linseed oil;
(e) 0-5% soy lecithin; and
(f) 0-5% dry fat;
and wherein the oil component does not comprise marine oil, and further wherein the EPA and DHA content of the oil component is 7.5-8%, such as 7.6-7.8%.

In some embodiments, the oil component comprises:
(a) 30-45% modified oilseed crop plant oil comprising EPA and DHA;
(b) 0-15% animal fat, such as poultry fat;
(c) 25-40% rapeseed oil;
(d) 0-8% linseed oil;
(e) 0-12% soy lecithin; and
(f) 0-5% dry fat;
and wherein the oil component does not comprise marine oil, and further wherein the EPA and DHA content of the oil component is 5.5-6.5%, or 5.8-6.

In some embodiments, the oil component comprises:
(a) 40-60% modified oilseed crop plant oil comprising EPA and DHA;
(b) 0-5% animal fat, such as poultry fat;
(c) 10-60% rapeseed oil;
(d) 0-5% linseed oil;
(e) 0-5% soy lecithin; and
(f) 0-5% dry fat;
wherein the fish feed does not comprise marine oil, and further wherein the EPA, DPA, and DHA content of the oil is 7.5-8%, or 7.6-7.8%.

In some embodiments, the modified oilseed crop plant is a *Brassica* or *Camelina* species.

In some embodiments, the set of ingredients comprises 0-15% soy oil.

In some embodiments, the fish feed is powdered or pelleted. In some embodiments, the powder or pellets are oil-coated.

It is to be understood that both the foregoing general description and the following more detailed description are exemplary and explanatory only and are not restrictive of the claims.

DESCRIPTION OF PARTICULAR EMBODIMENTS

Definitions

Unless otherwise defined, scientific and technical terms used in connection with the present invention shall have the meanings that are commonly understood by those of ordinary skill in the art. Further, unless otherwise required by context, singular terms shall include pluralities and plural terms shall include the singular. Definitions of particular terms may be contained within this section or may be incorporated into the sections of text below.

In this application, the use of "or" means "and/or" unless stated otherwise. In the context of a multiple dependent claim, the use of "or" refers back to more than one preceding independent or dependent claim in the alternative only. Unless otherwise indicated, the term "include" has the same meaning as "include, but are not limited to," the term "includes" has the same meaning as "includes, but is not limited to," and the term "including" has the same meaning as "including, but not limited to." Similarly, the term "such as" has the same meaning as the term "such as, but not limited to." Also, terms such as "element" or "component" encompass both elements and components comprising one unit and elements and components that comprise more than one subunit unless specifically stated otherwise.

The term "oil" as used herein refers to a substance formed primarily of fatty acids. An oil herein may be either liquid or solid at room temperature and may be in liquid or solid form (e.g. a dry fat). Oils are formed primarily of fatty acids, for instance in triglyceride or phospholipid (e.g. lecithins) form. Examples of oils herein include various vegetal oils such as *Brassica* oils as well as marine oils such as fish oil or krill oil, animal fats such as poultry fat, and phospholipids such as soy lecithin. Oils may also include other compounds often associated with fats such as sterols, e.g. cholesterol, or tocopherols.

A "fatty acid" herein refers to a molecule comprising a hydrocarbon chain and a terminal carboxylic acid group. As used herein, the carboxylic acid group of the fatty acid may be modified or esterified, for example as occurs when the fatty acid is incorporated into a glyceride or a phospholipid or is attached to another molecule such as acetyl-CoA (e.g., COOR, where R refers to, for example, a carbon atom). Alternatively, the carboxylic acid group may be in the free fatty acid or salt form (i.e., $COO^-$ or $COOH$).

A "saturated" fatty acid is a fatty acid that does not contain any carbon-carbon double bonds in the hydrocarbon chain. An "unsaturated" fatty acid contains one or more carbon-carbon double bonds. A "polyunsaturated" fatty acid contains more than one such carbon-carbon double bond while a "monounsaturated" fatty acid contains only one carbon-carbon double bond. Carbon-carbon double bonds may be in one of two stereoconfigurations denoted "cis" and "trans." Naturally-occurring unsaturated fatty acids are generally in the "cis" form.

Unsaturated fatty acids may, for example, be of the "omega-6" (or n6 or ω6) or "omega-3" (n3 or ω3) type. Omega-6 fatty acids have a first double bond at the sixth position from the methyl end of the fatty acid chain while omega-3 fatty acids have a first double bond at the third position from the methyl end of the chain. The term "long-chain" when applied to an omega-3 or omega-6 fatty acid means having a chain of 20 carbons or more.

Fatty acids found in plants and oils described herein may be incorporated into various glycerides. The terms "triacylglycerol," "triglyceride," and "TAG" are used interchangeably herein to refer to a molecule comprising a glycerol that is esterified at each of its three hydroxyl groups by a fatty acid and thus, comprises three fatty acids. The terms "diacylglycerol," "diglyceride," and "DAG" refer to a molecule comprising a glycerol esterified by a fatty acid at only two of its three available hydroxyl groups, such that it contains only two fatty acids. Likewise, the term "monoglyceride" refers to a glycerol modified by a fatty acid at only one of the available three hydroxyl groups so that it comprises only one fatty acid.

Fatty acids found in plants and oils described herein may also be incorporated into various "phospholipids," abbreviated "PL" herein. Phospholipids are molecules that comprise a diglyceride, a phosphate group, and another molecule such as choline ("phosphatidyl choline;" abbreviated "PC" herein), ethanolamine ("phosphatidyl ethanolamine;" abbreviated "PE" herein), serine "phosphatidyl serine;" abbreviated "PS" herein), or inositol ("phosphatidyl inositol;" abbreviated "PI" herein). Phospholipids, for example, are important components of cellular membranes.

Fatty acids described herein include those listed in the table below along with abbreviations used herein and structural formulae. According to Table 1 below, the naming convention comprises the number of carbons in the fatty acid chain (e.g. C16, C18, etc.) followed by a colon and then the number of carbon-carbon double bonds in the chain, i.e., 0 for a saturated fatty acid comprising no double bonds or 1, 2, 3, etc. for an unsaturated fatty acid comprising one, two, or three double bonds.

TABLE 1

Fatty acid nomenclature

| Fatty acid name (abbreviation) | Formula |
| --- | --- |
| Lauric acid (La) | C12:0 |
| Myristic acid (M) | C14:0 |
| Palmitic acid (P) | C16:0 |
| Palmitoleic acid (Po) | C16:1 |
| Stearic acid (S) | C18:0 |
| Oleic acid (O) | C18:1 |
| Linoleic acid (L) | C18:2 |
| Linolenic acid (Ln) | C18:3 |
| Arachidic acid (A) | C20:0 |
| Gondoic acid (G) | C20:1 |
| Eicosapentaenoic acid (EPA) | C20:5 |
| Behenic acid (B) | C22:0 |
| Erucic acid (E) | C22:1 |
| Docosapentaenoic acid (DPA) | C22:5 |
| Docosahexaenoic acid (DHA) | C22:6 |
| Lignoceric acid (Li) | C24:0 |

The levels of particular types of fatty acids may be provided herein in percentages out of the total fatty acid content of an oil. Unless specifically noted otherwise, such percentages are weight percentages based on the total fatty acids, TAGs, or PLs in the oil component, respectively, as calculated experimentally. Thus, for example, if a percentage of a specific species or set of fatty acids is provided, e.g., EPA or EPA+DHA or EPA+DPA+DHA, this is a w/w percentage based on the total fatty acids detected in the oil. The fatty acid composition of an oil can be determined by methods well known in the art. The American Oil Chemist's Society (AOCS) maintains analytical methods for a wide variety of tests performed on vegetable oils. Hydrolysis of the oil's components to produce free fatty acids, conversion of the free fatty acids to methyl esters, and analysis by gas-liquid chromatography (GLC) is the universally accepted standard method to determine the fatty acid composition of an oil sample. The AOCS Procedure Ce 1-62 describes the procedure used.

As used herein, reference to an oilseed "plant" or "plants" includes the plant and its progeny, such as its $F_1$, $F_2$, $F_3$, $F_4$, and subsequent generation plants. As used herein, a "line" or "breeding line" is a group of plants that display little or no genetic variation between individuals for at least one trait, such as a particular gene mutation or set of gene mutations. Such lines may be created by several generations of self-pollination and selection or by vegetative propagation from a single parent using tissue or cell culture techniques. A "variety" refers to a line that is used for commercial production and includes hybrid and open-pollinated varieties.

An "oilseed plant" or "oilseed crop plant" as used herein encompasses a variety of plant species that may be used in part as a source of oils. For example, the plant may include any of Brassica, flax, linseed, hemp, walnut, evening primrose, soy, sunflower, cotton, corn, olive, safflower, cocoa, peanut, hemp, Camelina, crambe, palm, coconut, sesame, castor bean, lesquerella, tallow, seanuts, tungnuts, kapok fruit, poppy, jojoba, perilla, or groundnut species. Furthermore, in some embodiments, the oilseed plant is a Brassica species or Camelina species. Brassica plants may include, for example, B. napus, B. juncea, and B. rapa (rapeseed) species, while Camelina species include, for example, C. sativa.

The term "oil from an oilseed plant" and related terms as used herein refer to an oil derived from seeds or other parts of an oilseed crop plant. In some embodiments, the oil also may be chemically treated or refined in various ways, for example by degumming, refining, bleaching, dewaxing, and/or deodorizing.

The term "modified oilseed plant oil" as used herein refers to a plant species from which the oil is derived has been genetically modified to produce long-chain omega-3 fatty acids such as EPA, DPA, and/or DHA and is, accordingly, referred to as a or an "oil from a genetically modified oilseed plant" or by similar terms. The terms modified or genetically modified are used here to distinguish the long-chain omega-3 fatty acid producing plants or the oils derived from such plants from other plant lines that do not produce long-chain omega-3 fatty acids. If the oilseed plant is, for example, a Brassica or Camelina species, then the term "modified Brassica oil" or "modified Camelina oil" may be used.

In contrast to a "modified Brassica oil" such as a modified rapeseed oil, the general term "rapeseed oil" without including the adjective "genetically modified" or "modified," unless specifically clarified otherwise, refers to an oil from seeds or other parts of a rapeseed plant that has not been genetically modified to produce long-chain omega-3 fatty acids. Note that the plant from which such a "rapeseed oil" or other vegetal oil (e.g. soy oil, linseed oil, etc.) is derived may certainly be genetically modified in other ways, such as for herbicide resistance or to modify the proportions of certain fatty acids in its oil. But the plant is not modified such that it produces long-chain omega-3 fatty acids.

The term "oil component" as used herein refers to a portion of a fish feed comprising exclusively or predominately oils. The oil component may be comprised of a single oil such as a DHA and EPA containing oil from a modified

*Brassica* plant or other modified plants. Alternatively, the oil component may be a mixture of any number of oils from other plant or animal sources including DHA and EPA containing oil from a modified *Brassica* plant or other modified plants. It may also contain modified or processed oils such as dry fats or hard fats.

A "marine oil" refers to a material comprising at least 80% of an oil derived from marine species such as fish, krill, or algae. In some embodiments, the marine oil may comprise a product stream obtained from a refining process and/or a concentration process carried out with an oil derived from marine species such as fish, krill, or algae. Marine oil does include materials that contain a residual or minor amount of oil derived from marine species, such as fish meal.

An "animal fat" or "animal oil" refers to an oil, which may be solid at room temperature, derived from animals, such as poultry, beef, pork, fish, and the like. In some embodiments, where the fish feed comprises an animal fat but not a marine oil, the animal fat is not derived from a marine species, such as fish or krill, but from a terrestrial species such as poultry or beef.

A "dry fat" is an oil, such as a partially or fully hydrogenated oil, that is provided in a dry form, such as in a powder or a low-dust particle. The oil in a dry fat may include fully hydrogenated plant oil such as rapeseed oil (e.g., high erucic acid rapeseed oil, canola oil), palm oil, and fully hydrogenated cottonseed or soybean oil.

An "ingredient mixture" or "set of ingredients" as used herein when pertaining to ingredients for a fish feed material refer interchangeably to the list of ingredients to be included in the fish feed material, in the appropriate weight percentages out of the total ingredient list. The ingredients in the set of mixture may be added at different times or stages during production of the final fish feed material. The weight percentages of ingredients in the set of ingredients may differ from those in the final fish feed material due to changes in moisture content or oil leakage or incomplete absorption of materials added to the surface of the fish feed material, for example.

A "pellet" as used herein, for example, to refer to fish feed compositions, may be a solid particle that may be any size or shape suitable for use as a fish feed. Pellets are often mechanically extruded into roughly cylindrical or spherical shapes by an extruder device, but they may also be prepared as flakes or other flat shapes, for example, and their length and diameter may also vary depending upon what is desirable for storage, transport, environmental concerns, and the type of fish they are intended for feeding. Fish feeds may also be provided in "powder" form, i.e. in fine, small particles.

Oils from Modified Oilseed Crop Plants

Vegetal oils containing long-chain omega-3 fatty acids such as EPA, DPA, and DHA may come from a variety of oilseed crop plants, including, for example, any of *Brassica*, flax, linseed, hemp, walnut, evening primrose, soy, sunflower, cotton, corn, olive, safflower, cocoa, peanut, hemp, *Camelina, crambe*, palm, coconut, sesame, castor bean, *lesquerella*, tallow, seanuts, tungnuts, kapok fruit, poppy, jojoba, *perilla*, or groundnut species. In some embodiments, the oilseed plant is a *Brassica* species or *Camelina* species. Among *Brassica* plants are, for example, *B. napus, B. juncea*, and *B. rapa* (rapeseed) species, while *Camelina* species include, for example, *C. sativa*.

In general, the plants are modified to express the enzymes needed for production of EPA, DPA, and DHA from precursor fatty acids. The specific enzymes expressed in the plants may differ, for example, as there are multiple enzymatic pathways that could be used for expression of these fatty acid species.

The actual percentage of the total oil from the plants that consists of EPA, DPA, or DHA may also vary. But, in some embodiments, the modified oilseed crop plant oil contains at least 5% EPA, such as, for example 5-25% EPA or 5-15% EPA. In some embodiments, the modified oilseed plant oil comprises 5-6%, 6-7%, 7-8%, 8-9%, 9-10%, 10-15%, or >15% EPA. In some embodiments, the oilseed plant oil also comprises DPA. In some embodiments, the modified oilseed plant oil comprises at least 1% DPA, such as at least 2% DPA, such as 1-10% DPA, 1-5% DPA, 2-5% DPA, or >10% DPA. In some embodiments, the oil contains 1-2% DPA, 2-3%, 3-4%, or 4-5% DPA. In some embodiments, the modified oilseed crop plant also is engineered to produce DHA. In some embodiments, the resulting oil contains at least 0.5% DHA, such as at least 1% DHA, such as 1-2%, 2-3%, 3-4%, 1-4%, 1-5%, or >5% DHA.

In some embodiments, the EPA+DHA content of the oil is, for example, at least 6%, such as 6-50%, such as 6-30%, such as 6-15%, such as 8-15%, such as 8.5-13.5%. In some embodiments, the EPA+DHA content is 6-8%, in others it is 8-10%, in others it is 10-12%, an in still others it is 12-14%. In some embodiments, the EPA+DHA content of the oil is tailored to a specific percentage by mixing the oil from the modified plants with oil from plants of the same or similar species that do not produce long-chain omega-3 fatty acids. This way, for instance in some embodiments, the amount of EPA and DHA can be controlled without significantly altering the percentages of other fatty acids in the oil.

In some embodiments, the amount of EPA+DPA+DHA in the oil is, for example, at least 8%, such as between 8 and 50%, such as 8-40%, such as 8-20%, such as 10-20%, such as 10-15%, 15-20% or >20%.

In some embodiments, the modified oilseed crop plants may encompass plants described in or prepared using methods described in WO 2016/075327, which describes EPA and DHA producing *Brassica* lines and how to produce such lines, among other embodiments. In some embodiments, the modified oilseed crop plants may encompass plants described in or prepared using methods described in WO 2015/089587, which describes EPA and DHA producing oilseed plants and how to produce such lines, among other embodiments. In some embodiments, the modified oilseed crop plants may encompass plants described in or prepared using methods described in WO 2004/071467. which describes EPA and DHA producing *Brassica* lines and how to produce such lines, among other embodiments. In some embodiments, the modified oilseed crop plants may encompass plants described in or prepared using methods described in U.S. Pat. No. 7,807,849 B2, which describes EPA and DHA producing *Arabidopsis* lines and how to produce such lines. In some embodiments, the modified oilseed crop plants may encompass plants described in or prepared using methods described in WO 2013/153404, which describes EPA and DHA producing *Camelina* lines and how to produce such lines. All of these documents are incorporated by reference herein for their disclosures of modified plant lines and how to produce such lines.

Ingredients for Fish Feed Products

In some embodiments, a fish feed may comprise a set of ingredients comprising nutrients such as fish meal, soy meal, cereals, binders such as starches, appropriate vitamins and minerals, an ingredient such as glycerol monostearate, and an oil component. In some embodiments, the oil component comprises 25-45% of the set of ingredients. In some embodiments, the oil component comprises 25-30% of the set of ingredients. In some embodiments, the oil component comprises 30-40% of the set of ingredients. In some embodiments, the oil component comprises 30-35% of the set ingredients. In some embodiments, the oil component comprises 35-40% of the set ingredients. In some embodiments, the oil component comprises 25% of the set of ingredients. In some embodiments, the oil component comprises 33% of the set ingredients.

In some embodiments, oil from modified oilseed plants is the only significant source of EPA and DHA in the oil component or fish feed. For example, use of such oil may eliminate the need to include marine oil in the fish feed and thus, the fish feed and oil component in some embodiments contains no marine oil. In other embodiments, the fish feed formulation may include residual marine oil that is a component of fish meal used in the set of ingredients, but not contain any additional or supplemental marine oil in the oil component or set of ingredients. In other embodiments, the oil from the modified oilseed plants may be mixed with marine oil to reduce the percentage of EPA and DHA in the fish feed from marine sources, but not to eliminate it.

In some embodiments, a fish feed set of ingredients is prepared for use in a particular region of the planet and its contents are adjusted to the needs of the fish in that region and/or to what is typical for the diet of fish in the region. Thus, for example, fish feeds intended for use in areas such as Norway or Scotland may contain a different percentage of EPA+DHA or of total long-chain omega-3 fatty acids than fish feeds intended for areas such as Chile or Canada. Actual percentages of different oil components in fish feeds may also vary seasonally or from year to year due to natural variations.

In some embodiments, a fish feed set of ingredients is prepared for use in a first country, such as Chile. In some embodiments, such a set of ingredients contains a lower percentage of oil or oil component in the set of ingredients as well as a lower percentage of EPA and DHA within the oil component compared to a fish feed set of ingredients for a second country, such as Norway. In some embodiments, the percentage of oil in a fish feed set of ingredients for use in a country (e.g., Chile) is 20-30%, such as 22-28%, or such as 24-26%, or such as 25%. In some embodiments, the percentage of EPA+DHA out of the oil component of the set of ingredients is 5-10%, such as 5.5-6.5%, or 5.7-6.1%, or 5.8-6.0%, or 5.9%.

In some embodiments, the oil component comprises no EPA or DHA derived from marine oil or marine oil containing materials such as fish meal. For example, in some embodiments, the fish feed contains no marine oil. In some embodiments, the oil component contains additional oil materials such as a non-marine animal fat, such as poultry fat, pork fat, or beef fat, other vegetal oils derived from plants not engineered to produce EPA or DHA such as linseed oil, soy oil, sunflower oil, palm oil, or *Brassica* oil e.g. a rapeseed (e.g. canola) oil. In some embodiments, the oil component comprises up to 15% of any of the above oils, such as 0-15% or 0-10% non-marine animal fat, such as 5-15%, 7-13%, 9-11%, or 10-12% non-marine animal fat. In some embodiments, the oil component comprises 0-15% or 0-10% rapeseed oil, such as 5-15%, 7-13%, 9-11%, or 10-12%. In some embodiments, the oil component comprises 0-15% or 0-10% soy oil, such as 5-15%, 7-13%, 9-11%, or 10-12%. In some embodiments, the oil component comprises 0-10% linseed oil, such as 2-8%, 4-8%, or 4-7%.

Further, in some embodiments, the oil component comprises up to 15% lecithin. In some embodiments, the oil component comprises 5-15% lecithin, such as 8-15%, or 10-13%, or 10-12% lecithin. In some embodiments the lecithin is soy lecithin. The oil component may also contain one or more dry fat materials such as a fully hydrogenated vegetal oil. In some embodiments, a fish feed pellet is prepared in which the dry fat is added after extrusion into pellet form, such as at the stage of coating the pellet. In some embodiments, the oil component comprises up to 5% dry fat, such as 1-5%, 1%, 2%, 3%, 4%, or 5% dry fat.

The actual mixture of the oil from the modified oilseed crop plants to other vegetal oils in the set of ingredients may vary depending upon the percentage of EPA+DHA and/or the percentage of EPA+DPA+DHA in the modified plant oil. For example, if a particular EPA+DHA percentage is desired, then an oil comprising 8.5% EPA+DHA should be at a higher percentage in the oil component than an oil comprising 13.5% EPA+DHA. This can be adjusted by mixing the oil from the modified oilseed crop plant with an oil from the same or similar plant species that has not been modified to produce EPA and DHA. Similarly, if a particular percentage of EPA+DPA+DHA is desired, then an oil comprising 12.5% EPA+DPA+DHA should be at a higher percentage in the oil component than an oil comprising 17.5% EPA+DHA.

In some embodiments, the fish feed is prepared for use in a second country, such as Norway or Scotland. In such embodiments, a higher percentage of oil may be desired in the pellets, as well as a higher percentage of EPA+DHA. In some embodiments, the percentage of oil component in a fish feed set of ingredients for use in the second country is 25-35%, such as 30-35%, or such as 32-34%, or such as 33%. In some embodiments, the percentage of EPA+DHA in the oil component of the set of ingredients is 6-9%, such as 7-8%, or 7.5-8%, or 7.6-7.8%, or 7.7%.

In some embodiments, the oil component comprises 0-5% soy oil, such as 1%, 2%, 3%, 4%, or 5% In some embodiments, the oil component comprises 0-5% linseed oil, such as 1%, 2%, 3%, 4%, or 5%.

Further, in some embodiments, the oil component comprises no added lecithin. In other embodiments, the oil component comprises 0-15% lecithin. In some embodiments, oil component comprises 0-5% lecithin, such as 1%, 2%, 3%, 4%, or 5% lecithin. In some embodiments the lecithin is soy lecithin.

Methods of Making Fish Feed Pellets

The oils predominately used in the preparation of fish feeds are liquid at ambient temperatures. If a significant quantity of such oil is included in the feed components prior to their extrusion into pellets then the oil interferes with the extrusion process and the pellets possess relatively low strength. Therefore, the oil component of a fish feed is often added to the preformed pellets after they are already formed. See e.g. WO 98/49904. As noted above, fish feed pellets typically contain a number of ingredients to suit the nutritional needs of the fish. The pellets may be prepared from a set of ingredients that includes the oil component discussed above along with meal, such as fish meal, soy meal, or animal meat meal or a combination of two or more of those meals, cereals such as wheat, barley, gluten meal, or corn. A starch may be included, in part to act as a binder. Appropriate vitamins and minerals may be added. Certain lipid-based emulsifiers may also be included in the set of ingredients, such as a mono- or diglyceride such as glycerol monostearate. In some embodiments, the emulsifier is solid at room temperature and atmospheric pressure but may become liquid upon heating or increased pressure.

To prepare fish feed in extruded pellets, for example, components of the set of ingredients may be mixed, either at ambient temperature or upon heating and/or added pressure, for example in a pre-conditioning device which may continuously stir or agitate the mixture and provide heat as well as water or steam to facilitate mixing. In some cases, some of the oil component, or simply a small portion of another oil, may be added to the mixture at this stage while some of the oil component may be held back to be added during pre-conditioning or to the mixture during or after extrusion. For example, in a pre-conditioning process, the temperature may be raised to, for example, 75-95° C., and water or steam may be added to a moisture content of 5-30% by weight of the total set of ingredients contents.

The pre-conditioned mixture may then be extruded to form porous pellets, for example by being directed through an extruder. The ultimate shape and form of the pellets may depend on the design of the extruder used. For instance, extruders may have a single or twin screw design. Where such extruders are used, the final product may be affected by the screw and barrel profile and screw speed, as well as by the temperature and moisture content of the processed fish feed material entering the extruder.

As noted above, it is possible to add all of the oil component upon the initial mixing, or alternatively some, all, or a portion of, the oil component may be added to the pellets during or after extrusion. For example, the oil component may be absorbed into porous pellets. For example, pellets may be mixed with 0.05-1 part per weight of the oil component, 0.1-0.5 parts per weight, or 0.3-0.5 parts per weight. The oil component may be absorbed immediately after extrusion or, alternatively, after the pellets have been dried. The oil component may be added by spraying, coating, or dipping, such as in a mixing device. The pellets may also be vacuum coated with the oil component as in WO 98/49904. Typically, components of the set of ingredients such as dry fat are added after extrusion, for example.

Uses of Fish Feeds

Fish feeds according to the invention may be used to feed a variety of farmed fish, such as salmon, tilapia, shrimp, yellowtail, sea bream, halibut, yellow jack, carp, trout, eel, catfish, and the like. The exact content of oil and other nutrients may be adjusted to the local growing area as noted above and to the nutritional needs of the specific fish species. Furthermore, it may be possible to design the feeds so that the fish meat will ultimately have a particular EPA+DHA or a particular EPA+DPA+DHA content by adjusting the EPA+DHA or EPA+DPA+DHA content of the fish feed.

The invention will be further described in the following examples, which do not limit the scope of the invention described in the claims.

EXAMPLES

Example 1. Preparation of an EPA and DHA Containing Canola Oil from Genetically Modified *Brassica* Plant Seeds An expeller-pressed EPA/DHA Canola Oil was produced at Cargill Oil processing pilot plant in Fort Collins Colorado. Two samples of grain were received from BASF Plant Sciences prepared according to the methods of WO2016/075327. Expeller-pressed oil was made using conventional canola seed crushing process that includes tempering, flaking, flake conditioning, expeller pressing and filtering. The fatty acid compositions of the resulting two oils are shown below in Tables 2 and 3.

TABLE 2

| Fatty Acid | % (w/w) | Fatty Acid | % (w/w) |
|---|---|---|---|
| C14:0 | 0.1 | C20:3 HomoLin | 4.2 |
| C14:1 | 0.0 | C20:4 | 2.0 |
| C15:0 | 0.1 | C20:3 11-14-17 | 0.1 |
| C16:0 | 5.0 | C20:5 EPA | 5.8 |
| C16:1 | 0.3 | C22:0 | 0.3 |
| C17:0 | 0.1 | C22:1 | 0.0 |
| C18:0 | 2.7 | C22:2 | 0.0 |
| C18:1 Oleate | 31.1 | C23:0 | 0.0 |
| C18:1 Vaccenate | 3.8 | C22:4 | 0.7 |
| C18:2 | 29.9 | C22:3 | 0.1 |
| C18:3 Gamma | 1.5 | C22:5 DPA | 3.1 |
| C18:3 Alpha | 6.4 | C22:6 DHA | 0.7 |
| C20:0 | 0.7 | C24:0 | 0.1 |
| C20:1 | 0.9 | C24:1 | 0.2 |
| C20:2 | 0.2 | | |
| Total SAT | 9.1 | | |
| EPA + DPA + DHA | 9.6 | | |
| EPA + DHA | 6.5 | | |

TABLE 3

| Fatty Acid | % (w/w) | Fatty Acid | % (w/w) |
|---|---|---|---|
| C14:0 | 0.000 | C20:3 HomoLin | 1.83 |
| C15:0 | 0.000 | C20:4 | 3.77 |
| C16:0 | 4.415 | C20:3 11-14-17 | 0.20 |
| C16:1 | 0.199 | C20:5 EPA | 7.35 |
| C17:0 | 0.058 | C22:0 | 0.30 |
| C18:0 | 2.460 | C22:2 | 0.13 |
| C18:1 Oleate | 26.697 | C23:0 | 1.18 |
| C18:1 Vaccenate | 3.242 | C22:5 N3 DPA | 4.11 |
| C18:2 | 29.868 | C 22:6 DHA | 1.14 |
| C18:3 Gamma | 1.115 | C24:0 | 0.00 |
| C18:3 Alpha | 6.079 | C24:1 | 0.00 |
| C20:0 | 0.665 | C20:3 HomoLin | 1.83 |
| C20:1 | 0.854 | C20:4 | 3.77 |
| C20:2 | 0.82 | | |
| Total SAT | 9.08 | | |
| EPA + DPA + DHA | 12.61 | | |
| EPA + DHA | 8.50 | | |

Example 2. Fish Feed Oil Mixes

Fish feed oil mixes from modified *Brassica* oils with 8.5% EPA plus DHA content. The oil component of a fish feed intended for fish farms in a first country, such as in Chile, may have a set of ingredients as follows in Table 4, column 1. Such a fish feed oil component contains 5.9% EPA plus DHA and is used in making a fish pellet with 25% oil content. This fish feed oil component is replaced with one that does not contain marine oil but that otherwise contains the same percentage of EPA plus DHA and appropriate percentages of other nutritional ingredients. Specifically, the marine (fish) oil in the oil component of the pellets is replaced with *Brassica* oil derived from seeds or other parts of *Brassica* plants that have been genetically modified to produce EPA and DHA. The modified *Brassica* oil comprises 8.5% EPA plus DHA. (See, e.g. the oil of Example 1, Table 3.) The ingredients are mixed as in Table 4, column 2, to obtain the oil component of a fish feed with 5.9% EPA+DHA. Alternatively, the oil component may be mixed as shown in Table 4, column 3 to obtain a fish feed with 5.9% EPA+DPA+DHA. In this alternative mixture, the modified *Brassica* oil is mixed with another *Brassica* oil (labelled rapeseed oil in Table 4) to adjust the concentration of the long-chain omega 3 fatty acids appropriately.

TABLE 4

|  | Comparative Chile mixture | Chile mixture 1 modified Brassica | Chile mixture 2 modified Brassica |
|---|---|---|---|
| Fish (Chile) oil | 22.5% | 0% | 0% |
| Modified Brassica oil (8.5% EPA + DHA) | 0% | 69% | 56% |
| Blended marine oil | 12% | 0% | 0% |
| Poultry fat | 10% | 10% | 10% |
| Rapeseed oil | 32% | 0% | 10.5% |
| Linseed oil | 7% | 4.5% | 7% |
| Soy lecithin | 11.5% | 11.5% | 11.5% |
| Dry fat | 5% | 5% | 5% |
| Long-chain n3 wt % | 5.9% EPA + DHA | 5.9% EPA + DHA | 5.9% EPA + DPA + DHA |

Similarly, a second country (e.g., Norway or Scotland) fish feed oil component may be as shown in Table 5. The oil component in this case makes up 33% of the fish feed pellets. Its marine oil components may be replaced by modified *Brassica* oil with 8.5% EPA plus DHA as shown in Table 5, column 2, to achieve 7.7% EPA+DHA. Or an alternative set of oil ingredients can be used to achieve 7.7% EPA+DPA+DHA, as shown in Table 5, column 3, by mixing the modified *Brassica* oil with a rapeseed oil.

TABLE 5

|  | Comparative Norway mixture | Norway mixture 1 modified Brassica | Norway mixture 2 modified Brassica |
|---|---|---|---|
| Fish (Norway) oil | 32% | 0% | 0% |
| Modified Brassica oil (8.5% EPA + DHA) | 0% | 90% | 73% |
| Rapeseed oil | 66% | 2% | 19% |
| Dry fat | 2% | 3% | 3% |
| Long-chain n3 wt % | 7.7% EPA + DHA | 7.7% EPA + DHA | 7.7% EPA + DPA + DHA |

The modified *Brassica* oil used in Tables 4 and 5 contains 8.5% EPA plus DHA and 12.6% EPA+DPA+DHA, and has the following fatty acid profile: 0% C14:0; 0% C15:0; 4.4% C16:0; 0.2% C16:1; 0.06° C.17:0; 26.7% C18:1 (oleic acid); 3.2% C18:1 (vaccenic acid); 29.9% C18:2; 1.1% C18:3 (gamma linolenic acid); 6.1% C18:3 (alpha linolenic acid); 0.7% C20:0; 0.9% C20:1; 0.8% C20:2; 1.8% C20:3 (Homo-Lin); 3.8% C20:4; 0.2% C20:3 (11-14-17); 7.4% C20:5 (EPA); 0.3% C22:0; 0.1% C22:2; 1.2% C23:0; 4.1% C22:5 n3 (DPA); 1.1% C22:6 (DHA); 0% C24:0; 0% C24:1. The total saturated fatty acids in the oil are 9.1%.

Fish feed oil mixes from modified *Brassica* oils with 13.5% EPA plus DHA content.

A modified *Brassica* oil with 13.5% (w/w) EPA and DHA and 19% (w/w) EPA+DPA+DHA may also be used to prepare fish feed pellets. The oil has a fatty acid profile with the following compositions of C18, C20, C22, and C24 fatty acids: C18:0 2.5% (w/w); C18:1 28% (w/w); C20:0 0.5% (w/w); C20:1 0.7% (w/w); C20:2 0.1% (w/w); C20:3 (HomoLin) 0.8% (w/w); C20:4 2.5% (w/w); C20:3 (11-14-17) 0.1% (w/w); C20:5 (EPA) 12% (w/w); C22:0 0.2% (w/w); C22:4 0.7% (w/w); C22:5 (DPA) 5.5% (w/w); C22:6 (DHA) 1.5% (w/w); C24:0 0.1% (w/w); C24:1 0.1% (w/w).

The oil component of a fish feed intended for fish farms in a first country, such as in Chile, may have a mix of ingredients as follows in Table 6, column 1. Such a fish feed oil component contains 5.9% EPA plus DHA and is used in making a fish pellet with 25% oil content. This fish feed oil component is replaced with one that does not contain marine oil but that otherwise contains the same percentage of EPA plus DHA and appropriate percentages of other nutritional ingredients and that comprises 13.5% EPA plus DHA. The ingredients used are listed in Table 6, column 2, to obtain the oil component of a fish feed with 5.9% EPA plus DHA. Alternatively, to achieve 5.9% EPA+DPA+DHA, the oil mixture can be made as shown in Table 6, column 3.

TABLE 6

|  | Comparative Chile mixture | Chile mixture 3 modified Brassica | Chile mixture 4 modified Brassica |
|---|---|---|---|
| Fish (Chile) oil | 22.5% | 0% | 0% |
| Modified Brassica oil (13.5% EPA + DHA) | 0% | 44% | 36% |
| Blended marine oil | 12% | 0% | 0% |
| Poultry fat | 10% | 10% | 10% |
| Rapeseed oil | 32% | 22.5% | 30.5% |
| Linseed oil | 7% | 7% | 7% |
| Soy lecithin | 11.5% | 11.5% | 11.5% |
| Dry fat | 5% | 5% | 5% |
| Long-chain n3 wt % | 5.9% EPA + DHA | 5.9% EPA + DHA | 5.9% EPA + DPA + DHA |

Similarly, a second country (e.g., Norway or Scotland) fish feed oil component may be as shown in Table 7. The oil component in this case makes up 33% of the fish feed pellets.

TABLE 7

|  | Comparative Norway mixture | Norway mixture 3 modified Brassica | Norway mixture 4 modified Brassica |
|---|---|---|---|
| Fish (Norway) oil | 32% | 0% | 0% |
| Modified Brassica oil (8.5% EPA + DHA) | 0% | 90% | 73% |
| Rapeseed oil | 66% | 2% | 19% |
| Dry fat | 2% | 3% | 3% |
| Long-chain n3 wt % | 7.7% EPA + DHA | 7.7% EPA + DHA | 7.7% EPA + DPA + DHA |

Example 3. Preparation of Fish Feed Pellets

Fish feed pellets can be made using the oil component mixtures of Example 2 as follows, based on methods described in International Patent Publication WO 98/49904. The final composition of the fish feed pellets is outlined by the set of ingredients used according to Table 8.

TABLE 8

| Ingredient | Feed % |
|---|---|
| Fishmeal | 45-50% |
| Soy meal | 7-10% |
| Cereals (e.g. wheat, corn) | 5-10% |
| Binder (e.g. modified starch) | 2% |
| Vitamins | 0.5% |
| Minerals | 2% |
| Glycerol Monostearate | 3% |
| Oil mixture (see Tables 2-7) | 25-35% |

The final pellets are often, but not exclusively, prepared in two stages. In the first stage a porous pellet is prepared from a base formulation of ingredients. This base pellet is then coated with an oil containing composition (oil component) to prepare the finished pellet. The basic feed components can include fish and soy meals, cereals, binder, vitamins and minerals are mixed with about 1-3% oil (by weight based upon the total weight of the mixture). In addition, the glycerol monostearate can be mixed with about 3-8% of oil into a preconditioning unit. The feeds are pre-conditioned at a temperature of about 85° C. together with 18% water (by weight based on the weight of the dry feed mix entering the preconditioner) at a pressure of about 0.25 MPa.

The pre-conditioned mixture is extruded using a Wenger TX-57 twin screw extruder operating at 325 kg/hr with addition of further steam and water (or equivalent extruder under similar operating conditions). This process forms pellets of about a 9-11 mm diameter with roughly cylindrical shape. The extruded pellets, containing about 22% water by weight of moisture are then passed through a dryer where the moisture content is reduced to about 7% by weight of moisture.

The extruded pellets are then vacuum coated with and oil component by first heating the pellets and then applying a vacuum of about 20 kPa to the pellets, spraying the warmed oil on the pellets, releasing the vacuum to atmospheric pressure and then repeating these steps a second time. After the repeated coating step, the pellets are ready for use.

Due to the vacuum coating and other aspects of the preparation process, the final pellets may contain a higher oil content by weight than that of the above set of ingredients. For example, due to the oil coating, the final pellets may contain 5-10% more oil content than that of the starting mixture—e.g. 30-40% oil rather than the expected 25% or 33%.

It is also possible to measure the extent of oil leakage from the pelleted feed by the following method. First, about 5 g of feed to be tested is placed on a filter paper in a Petri dish. To simulate the effect of bag storage, 150 g is placed on an upturned Petri dish lid resting on the pellets. The dishes are then placed overnight in a 40° C. incubator. Simultaneously, a control dish with filter paper only is prepared to compensate for weight lost from the filter paper due to moisture evaporation. Leakage is calculated based upon the increase in weight of the filter paper as a percentage of the initial weight of the feed pellets, as compensated by the change in weight of the filter paper only control. In general, pellets comprising glycerol monostearate made by the above method may have low levels of oil leakage. (See WO 98/49904).

Example 4. Preparation of Fish Feed Pellets

A comparative salmon feeding study was completed with 3 diets of varying oil compositions. The first diet was a standard control composition containing fish oil. The second diet contained an oil from a transgenic *Brassica* plant containing DHA and EPA. The third diet was a negative control containing only canola oil and no additional oils with DHA or EPA.

Feed Compositions (Table 9)

| Ingredient | Treatment 1 Fish Oil Positive Control | Treatment 2 *Brassica* EPA/DHA | Treatment 3 Canola Oil Negative Control |
|---|---|---|---|
| Dry Base Pellet | 78.00% | 78.00% | 78.0% |
| Fish Oil Anchovy/Sardine | 5.44% | 0.00% | 0.0% |
| *Brassica* (8.37%) EPA/DHA Oil | 0.00% | 16.00% | 0.0% |
| Rapeseed Oil | 15.43% | 0.00% | 16.0% |
| Poultry fat | 1.13% | 6.00% | 6.0% |
| Total | 100.00% | 100.00% | 100.00% |
| Nutrient (calculated %) | | | |
| Saturated FA | 2.993 | 2.993 | 2.718 |
| EPA + DHA % in Total Feed | 1.339 | 1.339 | 0.000 |
| EPA + DHA % in coating oil | 6.08 | 6.08 | 0 |

TABLE 10

Total Nutrients in Test Diets (calculated)

| Total Nutrient | | Diet 1 control | Diet 2 | Diet 3 control |
|---|---|---|---|---|
| SFAs | % diet | 5.93 | 5.93 | 5.65 |
| EPA + DHA | % diet | 3.26 | 3.26 | 1.92 |
| EPA | % diet | 1.78 | 2.10 | 0.99 |
| DHA | % diet | 1.48 | 1.16 | 0.93 |
| DPA | % diet | 0.43 | 0.82 | 0.22 |

Table 10 shows the total calculated nutrient values for saturated fatty acids, EPA, DHA, and DPA taking into account the contribution made by the residual oil contained in the fish meal used to manufacture the base pellets. Pellets were prepared as described above in Example 3. A base dry pellet of Micro15 from EWOS was vacuum coated with one of the three text mixtures of Table 9. The test was performed in quadruplicate for each test feed with 100 Atlantic salmon per 350 L tank. Temperature was maintained at a constant 13.5 degrees C. Feed was provided 4 times per day manually with a target SFR (specific feed rate) of 2.6-2.7. Non-consumed feed was collected twice per day and recorded. Fish were adapted to the tanks for 17 days prior to the beginning of the feeding study. The study was run for a total of 48 days in a fresh water environment containing 5% saline. At the end of the study the fish were weighed, fatty acid composition analysed, and liver histology examined. Fatty acid analysis was performed in a standard manner by an outside laboratory. A portion of whole ground fish was solvent extracted and the fatty acid profile of the extracted oil determined.

No statistical differences were observed between the groups for final weight (48.7 g+/−0.1 g), weight increase (368%+/−2%), feed consumed (12.90 kg+/−0.3 kg), feed conversation ratio (0.845+/−0.004), or survival (99.5%+/−0.25%). All three groups performed essentially the same across these metrics. The liver histology of all groups was found to be normal.

Surprisingly the diet containing EPA/DHA from transgenic *Brassica* resulted in a 14.5% increase in total PUFA (EPA+DHA+DPA) content in the flesh of the test salmon compared to the fish oil control of diet 1. This is particularly surprising given the diets were normalized for saturated fatty acid content as well as EPA/DHA content. The DHA fatty acid content of the fish was able to be maintained at that of control even though the content of the test feed (2) was lower in DHA than the corresponding fish oil control of feed (1). In addition, DPA and EPA content of test diet 2 was significantly higher than the fish oil control of diet 1. DPA content was approximately 62% greater and EPA content was approximately 35% greater. As expected, the formulation with no DHA or EPA supplementation showed considerably lower values.

TABLE 11

Fatty acid content in harvested test salmon

| Diet | DPA g/100 g fat | DHA g/100 g fat | EPA g/100 g fat | Total PUFA g/100 g fat |
|---|---|---|---|---|
| 1) Fish oil control | 1.20 | 7.54 | 2.48 | 11.22 |
| 2) EPA/DHA Canola | 1.95 | 7.53 | 3.37 | 12.85 |
| 3) Canola oil control. | 0.79 | 5.98 | 1.63 | 8.40 |

What is claimed is:

1. A fish feed from a set of ingredients comprising 20-40% by weight of an oil component based on total weight of the fish feed,
   the oil component having an oil component fatty acid composition comprising a genetically modified *Brassica* oilseed crop plant oil component,
   wherein
   5-8% (w/w) of the oil component fatty acid composition based on total weight of the oil component fatty acid composition comprises a combination of EPA (eicosapentaenoic acid), DHA (docosahexaenoic acid), and DPA (docosapentaenoic acid) wherein the EPA, DHA, and DPA present in the fish feed are from the genetically modified *Brassica* oilseed crop plant oil component;
   wherein the genetically modified *Brassica* oilseed crop plant oil component is 35-45% (w/w) of the oil component fatty acid composition;
   wherein the genetically modified *Brassica* oilseed crop plant oil component comprises:
   a stearic acid (C18:0) content of 2.46% (w/w) to 2.7% (w/w);
   an oleic acid (C18:1) content of 26.697% (w/w) to 31.1% (w/w);
   a vaccenic acid (C18:1) content of 3.2% (w/w) to 3.8% (w/w);
   an arachidic acid (C20:0) content of 0.5% (w/w) to 0.7% (w/w);
   an EPA (C20:5) content of 5.8% (w/w) to 12% (w/w);
   a DHA (C22:6) content of 0.7% (w/w) to 1.5% (w/w); and
   a DPA (C22:5) content of 3.1% (w/w) to 5.5% (w/w); and
   wherein the content of fatty acids detected in any oil sample is determined via gas-liquid chromatography.

2. The fish feed of claim 1, wherein the fish feed does not contain fish meal.

3. The fish feed of claim 1, wherein 10-13% (w/w) of the oil component is soy lecithin.

4. The fish feed of claim 1, wherein the fish feed is in the form of a powder or a pellet.

5. The fish feed of claim 4, wherein the powder or the pellet are oil-coated.

6. A process of growing and harvesting fish comprising feeding a fish the fish feed of claim 1 and harvesting flesh of the fish.

* * * * *